(12) United States Patent
Ramsey et al.

(10) Patent No.: US 6,213,507 B1
(45) Date of Patent: Apr. 10, 2001

(54) VEHICLE TRAILER FRAME CROSS MEMBER/SUSPENSION ASSEMBLY MOUNT

(75) Inventors: John Edward Ramsey; Phillippi Randsome Pierce, both of Canton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/081,893

(22) Filed: May 20, 1998

(51) Int. Cl.⁷ .................................................. B62D 21/00
(52) U.S. Cl. ........................... 280/788; 280/789; 280/683
(58) Field of Search .................................. 280/788, 789, 280/124.158, 683, 678, 149.2

(56) References Cited

U.S. PATENT DOCUMENTS

| | | |
|---|---|---|
| 788,108 | 4/1905 | Jones . |
| 1,314,498 | 9/1919 | Bower . |
| 1,349,589 | 8/1920 | Sweet . |
| 1,372,699 * | 3/1921 | Kiltz ..................................... 280/788 |
| 1,468,522 * | 9/1923 | Snell et al. ........................... 280/788 |
| 2,119,193 | 5/1938 | Avery . |
| 2,700,551 | 1/1955 | Stump . |
| 2,707,110 * | 4/1955 | Stover ................................... 280/683 |
| 3,510,149 | 5/1970 | Raidel . |
| 3,664,679 | 5/1972 | Hille . |
| 5,114,183 | 5/1992 | Hayuda et al. . |
| 5,127,668 * | 7/1992 | Raidel .................................. 280/683 |
| 5,335,932 * | 8/1994 | Pierce .................................. 280/788 |
| 5,378,006 | 1/1995 | Stuart et al. . |
| 5,393,096 * | 2/1995 | Pierce et al. ......................... 280/788 |
| 5,720,489 | 2/1998 | Pierce et al. . |

FOREIGN PATENT DOCUMENTS

| | | |
|---|---|---|
| 21 24 547 | 12/1971 | (DE) . |
| 0 325 002 | 7/1989 | (EP) . |
| 0 773 119 A1 | 5/1997 | (EP) . |
| 612287 | 11/1948 | (GB) . |
| 1 150 002 | 4/1969 | (GB) . |
| 2-151578 | 6/1990 | (JP) . |
| WO 94 20320 | 9/1993 | (WO) . |

* cited by examiner

*Primary Examiner*—J. J. Swann
*Assistant Examiner*—James S. McClellan
(74) *Attorney, Agent, or Firm*—Buckingham, Doolittle & Burroughs, LLP; David P. Dureska, Esq.

(57) ABSTRACT

A vehicle trailer frame includes one or more cross member/suspension system mounting assemblies which mount axle/suspension systems and provide support against the twisting, parallelogram and S-shaped deflections typically caused by vertical, lateral, longitudinal and roll loads commonly encountered by a vehicle trailer during operation, and which can cause premature wear of trailer frame components. Each cross member/suspension system mounting assembly employs a minimal number of parts to support a single axle/suspension system, and includes a cross member and a suspension assembly mounting member disposed at each end of the cross member. Each suspension assembly mounting member is generally triangular-shaped and includes a horizontally-disposed base and a pair of vertically extending, diagonally opposed gussets. A plurality of openings are formed in each suspension assembly mounting member to reduce the overall weight of the cross member/suspension system mounting assembly, to accommodate an air spring mounting bolt, to facilitate welding of the mounting member to the trailer frame, and to promote drainage. Each suspension assembly mounting member fits on the cross member and is attached thereto by a continuous weld, and the mounting member and the cross member both nest in and are attached to other components of the trailer frame by continuous welds. Suspension assembly hangers are attached to the cross member/suspension system mounting assembly with continuous welds, and other components of a pair of suspension assemblies are suspended from the hangers, which in turn support an axle and wheels.

11 Claims, 18 Drawing Sheets

VEHICLE TRAILER FRAME CROSS MEMBER/SUSPENSION ASSEMBLY MOUNT

BACKGROUND OF THE INVENTION

1. Field of the Invention

The invention relates to vehicle trailers and in particular to frame-type vehicle trailers. More particularly, the invention is directed to a frame-type vehicle trailer which includes a pair of generally triangular-shaped members which form an assembly with a single cross member thereby eliminating a plurality of frame cross members, for more securely and efficiently supporting suspension assemblies suspended therefrom.

2. Background Art

Vehicle trailer frames and the axle/suspension systems suspended therefrom, including trailer frames for vans, reefers, tankers, dumps, lowbeds, flatbeds, platforms, and logging trailers, must be capable of reacting to roll moments, side loads, brake loads and other forces in order to safely and efficiently transport payloads or cargo. Since such forces act through the axle/suspension systems of the trailer, mounting of the axle/suspension systems to the trailer frame is of critical importance.

Flatbed and platform trailers in particular, due to their lack of a stiff upper structure and/or heavy duty characteristics such as is found in the other above-described types of vehicle trailers, are subject to greater deflections under load which can cause stress at rigid areas of the trailer. More specifically, such rigid areas are created by the trailer frame cross member/suspension assembly mounts. More particularly, a typical flatbed or platform structure typically consists of a pair of longitudinally extending, spaced-apart parallel main members, which are interconnected by three perpendicularly extending cross members for each axle/suspension system suspended from the trailer frame. The cross members typically are welded to the main members to form an integral rigid ladder-like trailer frame structure. A plurality of web stiffeners also are conventionally added to stabilize the relatively tall thin web of each main member, which usually is an I-beam, thus adding additional rigidity to the trailer frame structure.

Such a conventional flatbed or platform trailer assembly as described immediately above, while having years of utility in the field, fails to operate optimally for various reasons. More particularly, these types of trailer assemblies, although having certain rigid areas as noted hereinabove, generally display relatively flexible structures. For example, when such a trailer frame is subjected to lateral loads resulting from a sharp turn, the ladder-like structure of the frame deflects into a parallelogram-like structure. More specifically, these lateral loads actually combine with vertical, longitudinal and roll loads to produce a twisted parallelogram structure. In such a relatively flexible structure, the trailer frame main members and cross members actually distort into S-shaped structures. However, at the certain rigid areas of the trailer frame, namely, the interconnection areas of the cross members to the main members, the trailer frame is prevented from distorting resulting in high stress at such interconnections.

Aggravating the above-described prior art problem are the discontinuities in frame structure and interruptions of welds caused by the non-corresponding size of the suspension assembly hangers and the frame main members. More particularly, the hanger for each of the pair of suspension assemblies of each axle/suspension system typically is wider than the bottom flange of the respective main member I-beam from which each hanger depends. This extra width of each hanger relative to the bottom flange of its respective I-beam typically extends inboardly from the I-beams. So that the cross members disposed above the hangers can contact the upper surface of the hangers yet still nest in the I-beams to form a rigid mount for the suspension assemblies, the ends of each cross member are notched or coped out around the bottom flange of each I-beam. Alternatively, a spacer is used to fill the gap between the inboardly extending additional width of each hanger and the bottom surface of the cross members. In either case, the welds securing each hanger to the trailer frame structure must be interrupted at the junction of the bottom flange of the I-beam and the cross members or the spacer.

The above-described interrupted welds combined with the high stress inflicted on the rigid connection area of the cross members to the main members can result in cracks in the trailer frame main members or cross members, or in the welds at the nesting junction of each of the cross member ends in the web of its respective I-beam main member. Cracks further can occur in welds at the interface of each end of the cross members to its respective hanger or the air-spring mounting plate.

Moreover, assembly of a prior art trailer frame, including suspension assembly mounts, during manufacture of the vehicle trailer is difficult, time consuming, labor intensive, and requires a certain level of skill and training. There are typically about thirty (30) component parts needed to mount a single axle/suspension system, which are expensive to produce and inventory. In addition, the weight of those approximately thirty (30) component parts can total about three hundred fifty (350) pounds.

The above-described problems associated with conventional or prior art vehicle trailer frames are overcome by the trailer frame cross member/suspension assembly mount of the present invention. The present invention improves support against the twisting, parallelogram and S-shaped deflections typically caused by vertical, lateral, longitudinal, and roll loading, by replacing a plurality of cross members with a cross member/suspension assembly mount comprising a single cross member having a generally triangular-shaped structure attached to each of its ends, and also provides for an easy to assemble, simple and lightweight structure.

SUMMARY OF INVENTION

Objectives of the present invention include providing a vehicle trailer frame cross member/suspension assembly mount having significantly reduced weight from that found in prior art trailer frame cross member/suspension assembly mounts, yet having improved capability for withstanding combined lateral, longitudinal, roll and vertical loads.

Another objective of the present invention is to provide such a vehicle trailer frame cross member/suspension assembly mount which has a reduced number of components and therefore is simpler in structure and easier to assemble than prior art trailer frame cross member/suspension assembly mounts.

A still further objective of the present invention is to provide such a vehicle trailer frame cross member/suspension assembly mount that is free of weld and structural discontinuities.

These objectives and advantages are obtained by the vehicle trailer frame of the present invention, the general nature of which may be stated as including a pair of elongated spaced-apart parallel main members, and at least one cross member/suspension system mounting assembly, the assembly including a cross member having a pair of ends, the cross member extending between the main members, and each of the cross member ends being attached to a respective one of the main members, and a pair of suspension assembly mounting members, each of the mounting members being attached to a respective one of the cross member ends and a respective one of the main members, so that an axle/suspension system can be mounted on and depend from the cross member/suspension system mounting assembly.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
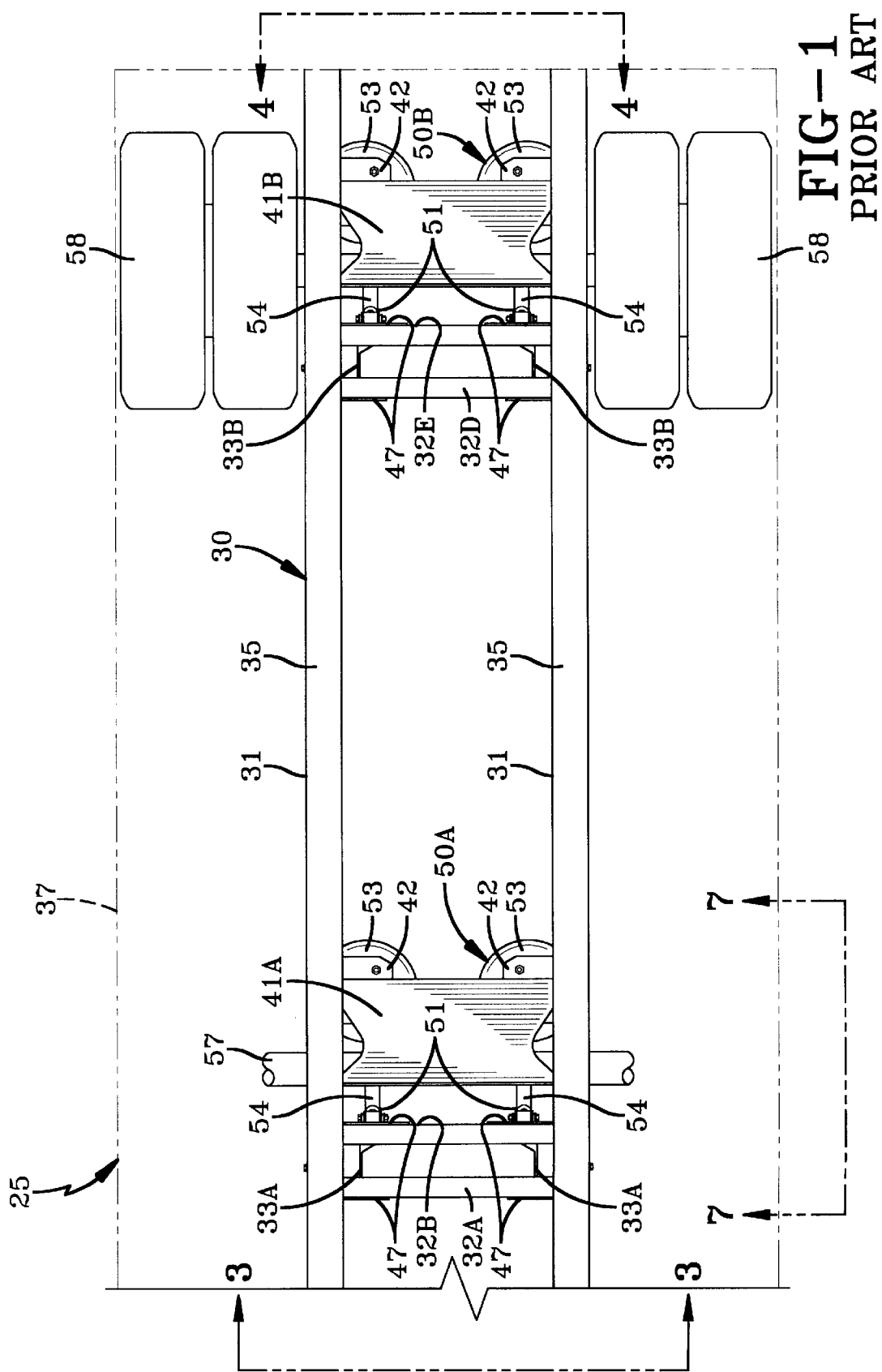
FIG. 1 is a fragmentary top plan view of a prior art flatbed or platform trailer, with the trailer deck represented by broken lines.

A prior art vehicle flatbed or platform trailer is indicated generally at 25 and is shown in FIG. 1. Trailer 25 includes a deck 37, a trailer frame 30 for supporting deck 37, a pair of main members 31, a plurality of cross members 32A through F, and front and rear pairs of hangers 33A and 33B, respectively, for suspending front and rear axle/suspension systems 50A and 50B, respectively.

Figure 2:
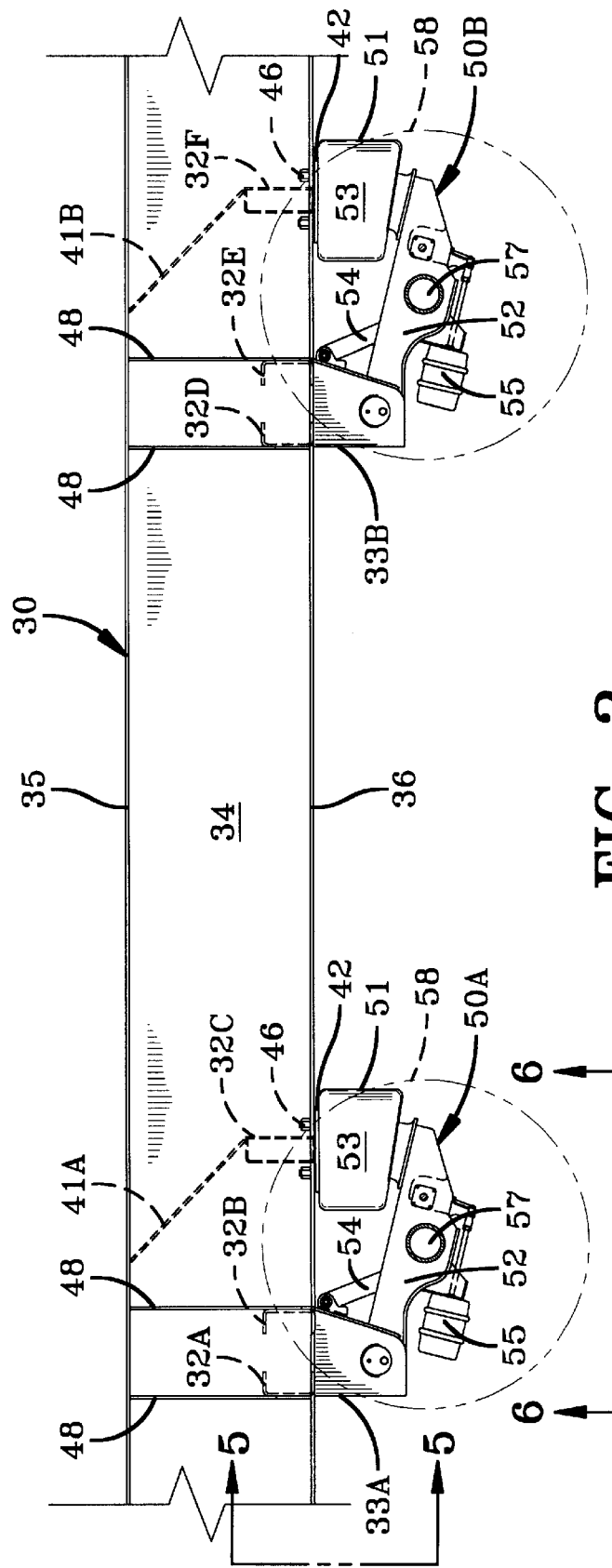
FIG. 2 is a fragmentary side view of the prior art trailer shown in FIG. 1, but with the location of the wheels and hidden parts represented by broken lines.
Figure 3:
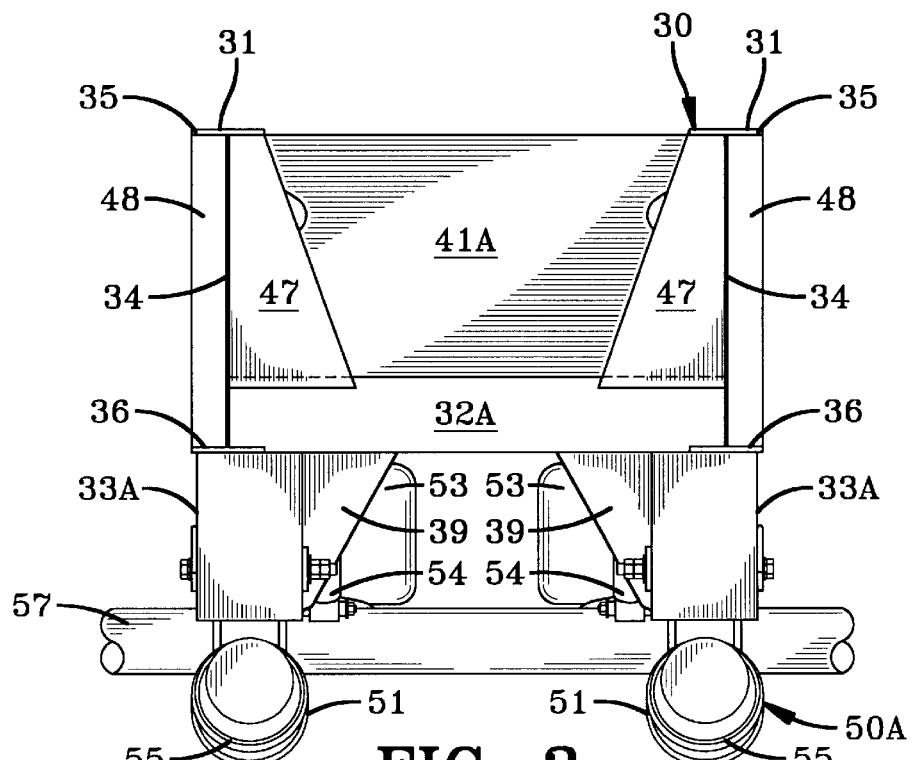
FIG. 3 is an enlarged fragmentary front view of the prior art trailer, looking in the direction of lines 3—3 of FIG. 1.
Figure 4:
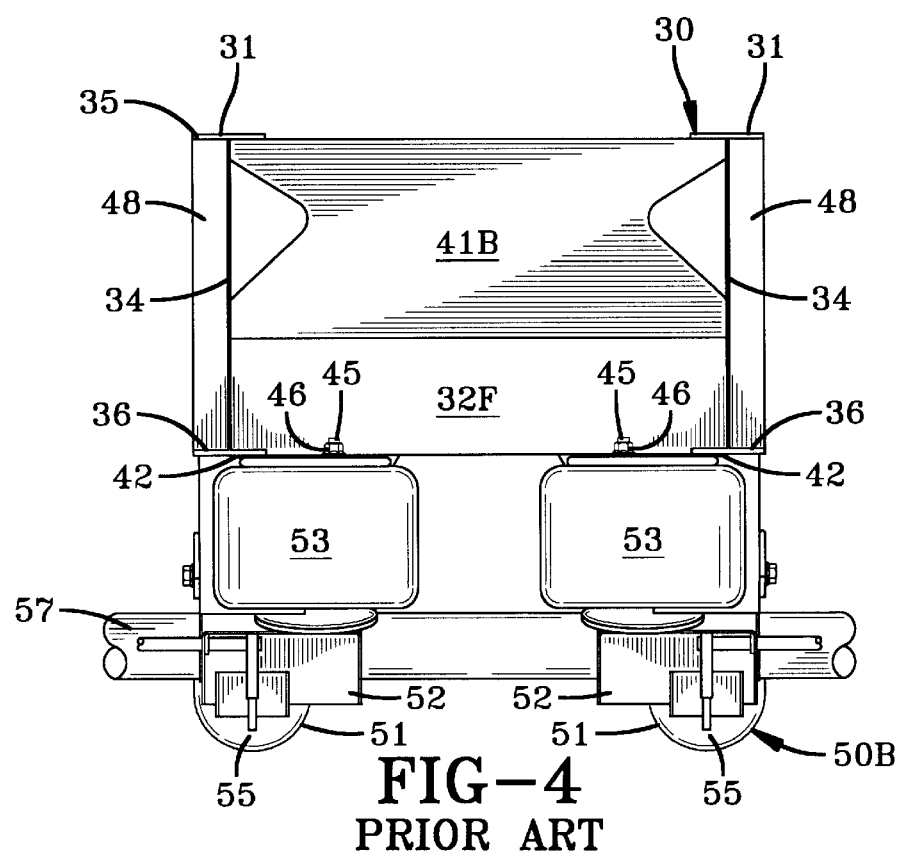
FIG. 4 is an enlarged fragmentary rear view of the prior art trailer, looking in the direction of lines 4—4 of FIG. 1.
Figure 5:
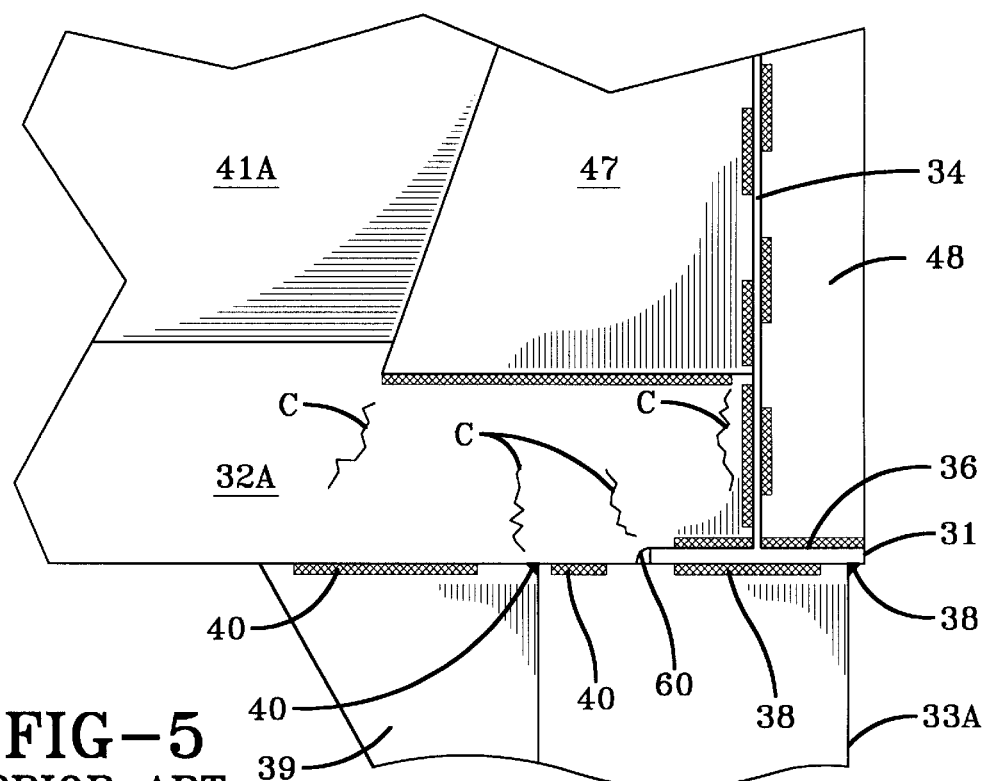
FIG. 5 is an enlarged view of a portion of the prior art trailer looking in the direction of lines 5—5 of FIG. 2, and showing the interruption of welds at various junctions of the cross member, main member, hanger and hanger gusset, and structural cracks resulting therefrom.
Figure 5A:
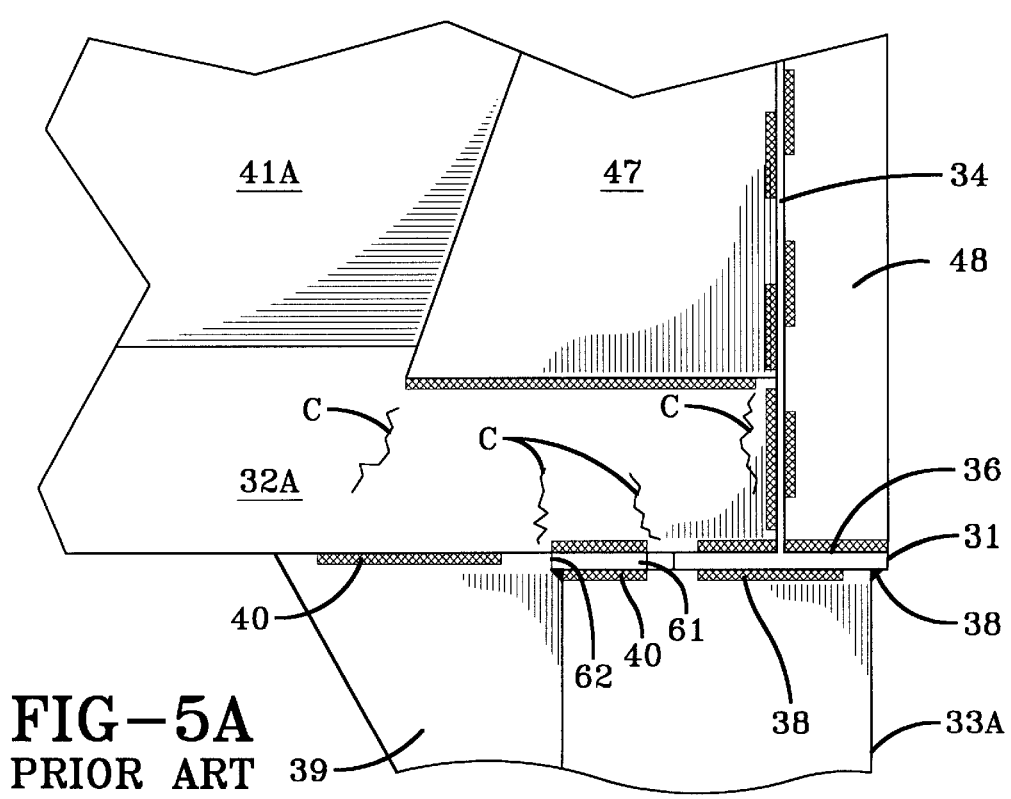
FIG. 5A is a view similar to FIG. 5, but showing a prior art embodiment wherein the cross member is free of a coped end at its junction to the main member, with a spacer inserted between the hanger and hanger gusset and the cross member.
Figure 6:
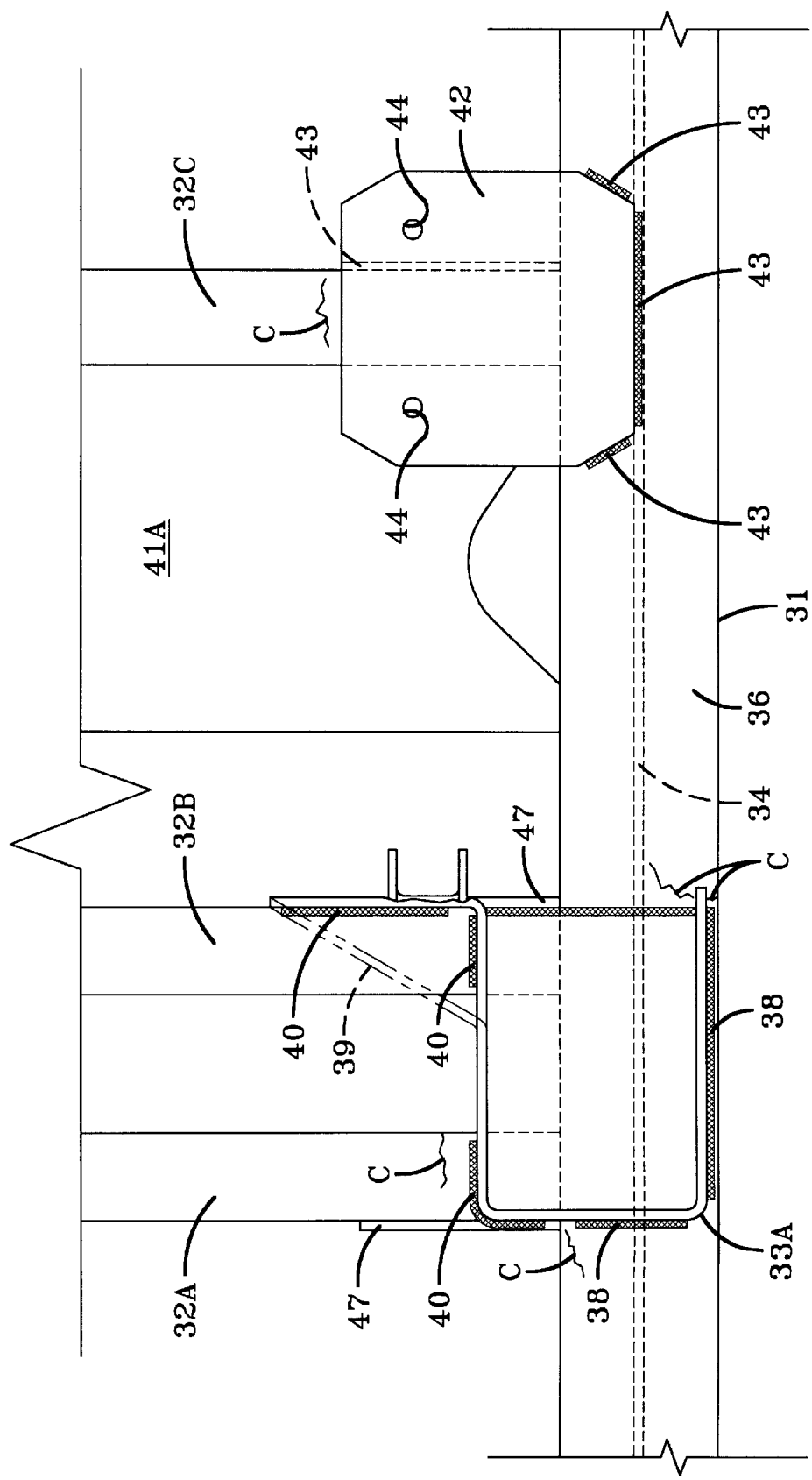
FIG. 6 is an enlarged fragmentary view looking in the direction of lines 6—6 of FIG. 2, with certain components of the suspension assembly removed and hidden parts represented by broken lines, and showing the interrupted welding pattern at various junctions of the cross members, main member, hanger, hanger gusset, and the air spring mounting plate.
Figure 7:
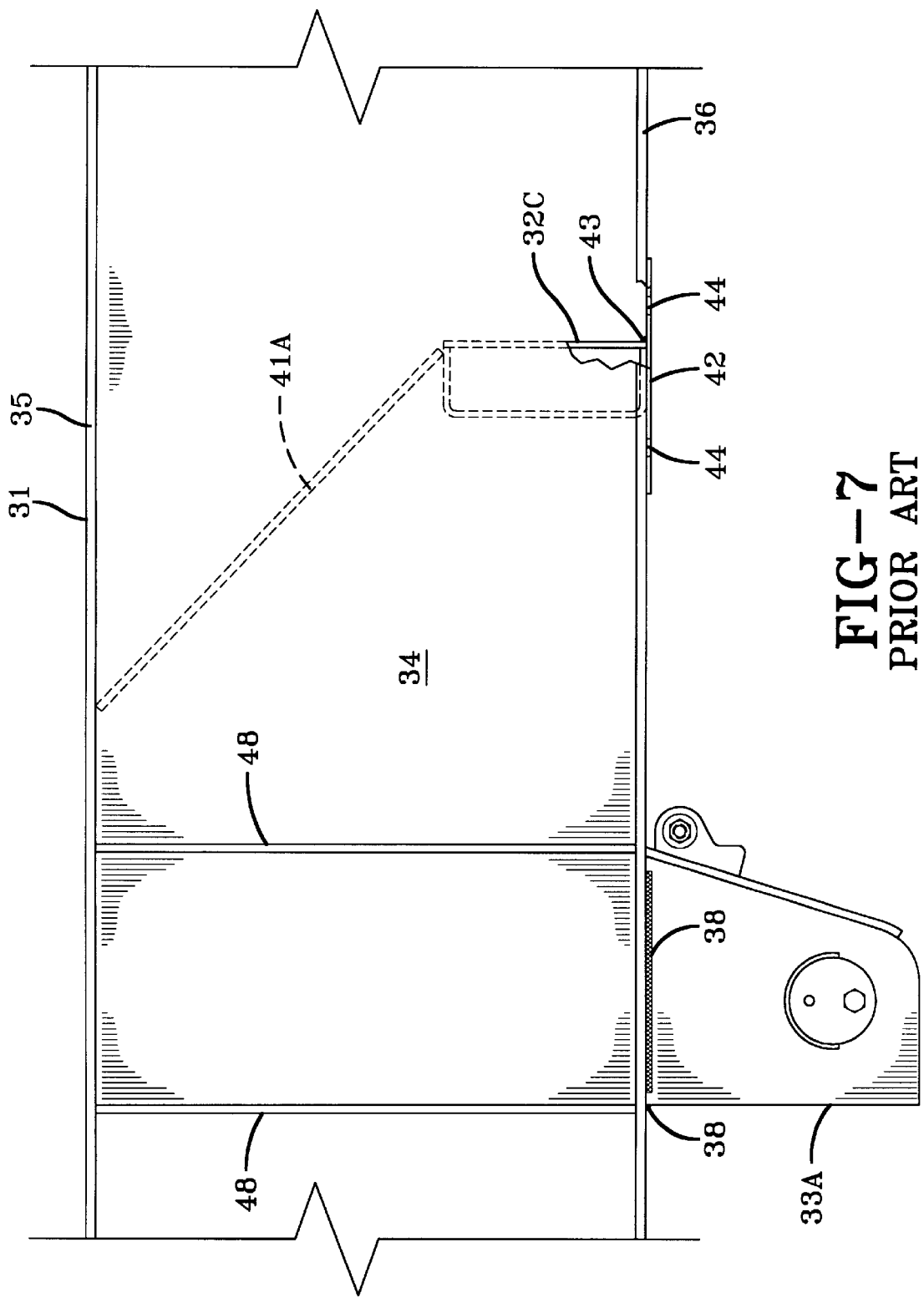
FIG. 7 is an enlarged fragmentary view looking in the direction of lines 7—7 of FIG. 1, with certain components of the suspension assembly removed, hidden parts represented by broken lines and portions broken away, and showing the interrupted welding pattern at the hanger to main member junction.

Specifically, each main member 31 is an elongated, generally I-shaped beam made of a metal such as steel or other suitable material. More particularly, each I-shaped beam 31 includes a vertical web plate 34 which interconnects in a spaced-apart relationship top and bottom horizontal flanges 35 and 36, respectively. Main members 31 are connected to each other in spaced-apart parallel relationship by cross members 32A through F, which extend between and are perpendicular to main members 31. Each of cross members 32A, B, D, and E, is a generally C-shaped beam made of a metal such as steel or other suitable material. The open portions of cross members 32A and 32B are opposed, and similarly the open portions of cross members 32D and 32E are opposed. Cross members 32C and 32F each is formed of two parts suitably joined to form a cross-sectional generally rectangular-shape (FIG. 2). Each end of each cross member 32 nests in a respective one of main members 31 at the inboard right-angle junction of web 34 and bottom flange 36, and is secured therein preferably by welding (FIGS. 3, 4 and 5). Each hanger 33 includes an integrally formed inboardly extending gusset 39, and is attached to the bottom surface of bottom flange 36 of a respective one of main members 31 by welds 38, as best shown in FIGS. 5 to 7. It can also be appreciated, as shown in FIGS. 1, 3, and 5 to 6, that each hanger 33 extends inboardly beyond the inboardmost edge of bottom flange 36, and the inboardly extending portion of hanger 33 and integral gusset 39 are each secured to the bottom surface of a certain pair of cross members 32A and B or 32D and E, by welds 40. As shown in FIG. 5A, if it is desired to refrain from forming a coped area 60 on each end of each cross member 32, then a spacer 61 must be used to achieve contact between the inboard portion of hanger 33 and the cross member. In such an arrangement, the height of gusset 39 is increased so that the length of spacer 61 can be minimized. However, the outboard end of gusset 39 is formed with a coped area 62 to accommodate spacer 61. As with the embodiment shown in FIG. 5, welds 40 are used to interconnect the arrangement of parts.

As mentioned hereinabove, and as best shown in FIGS. 1 through 4, prior art trailer frame 30 supports front and rear axle/suspension systems 50A and 50B, respectively. Inasmuch as each axle/suspension system 50A, B is suspended from trailer frame 30, but does not form an integral part thereof, only the major components of system 50 will be cited for aiding in the description of the environment in which the prior art trailer frame operates. Each axle/suspension system 50A, B, includes generally identical suspension assemblies 51 suspended from each hanger of the pair of hangers 33A, B, respectively. Each suspension assembly 51 includes a suspension beam 52, which is pivotally mounted on hanger 33 in a usual manner. An air spring 53 is suitably mounted on and extends between the upper surface of the rearwardmost end of suspension beam 52 and main member 31 at a location directly beneath a certain one of the cross members 32C, F. More specifically, an air spring mounting plate 42 is securely mounted on the bottom surface of bottom flange 36 of I-beam 31 and the bottom surface of certain cross member 32C, F by welds 43 (FIG. 6). Mounting plate 42 is formed with a pair of openings 44, which receive bolts 45 attached to the upper end of air spring 53. Nuts 46 are threadably engaged with air spring bolts 45 for securing air spring 53 to mounting plate 42. A shock absorber 54 extends between and is mounted on suspension beam 52 and hanger gusset 39. Other components of suspension assembly 51, mentioned herein only for the sake of relative completeness, include an air brake 55 and a height control valve (not shown). An axle 57 extends between and is captured in the pair of suspension beams 52 of each axle/suspension system 50A, B. One or more wheels 58 are mounted on each end of axle 57.

Figure 7A:
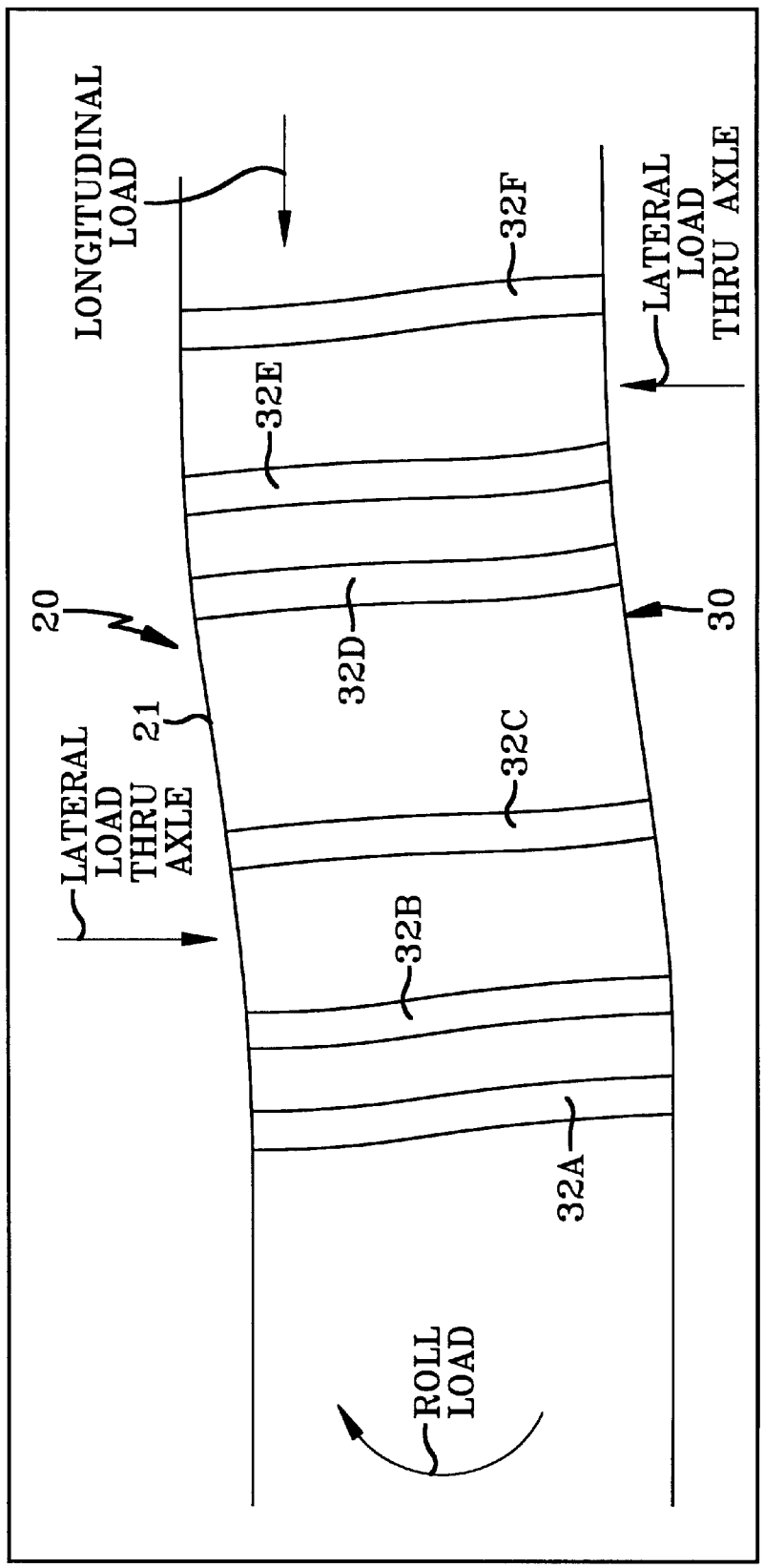
FIG. 7A is a schematic representation of the prior art flatbed or platform trailer shown in FIG. 1, showing some of the loads acting on the frame of the trailer during an event such as a sharp turn and the resultant distortion of the frame into a generally S-shaped structure.

As best shown in FIGS. 1–4 and 7, front and rear stiffening plates 41A and B, respectively, extend between and are suitably attached, such as by welding, to the upper surface of a certain one of cross members 32C, F, and web 34 and top flange 35 of each main member 31. A gusset 47 is attached by any suitable means such as welding, to each end of each of cross members 32A, B, D, and E, and to the inboard lower surface of top flange 35 and the inboard surface of web 34 of a respective one of I-beams 31. In addition, a rectangular-shaped rib 48 is attached to the outboard web surface 34 and the lower surface of top flange 35 and the upper surface of bottom flange 36 of main member 31 by any suitable means such as welding, and is aligned with a respective one of each gusset 47. Stiffening plates 41, gussets 47 and ribs 48 all are required to maintain the structural integrity of trailer frame 30, since the flatbed or platform deck 37 of this type of vehicle trailer 25 combined with the relatively large vertical height of I-beams 31, is not stiff enough to protect the frame from the various deflections under load that trailer 25 is subjected to during operation, with such loads being represented in FIG. 7A. Such loads can cause unwanted stress and possible cracking of welds at the rigid frame areas such as at the junction of various frame components and suspension assembly mounting structures, namely, I-beams 31, cross members 32, hangers 33, and mounting plates 42 (FIGS. 5–6). However, plates 41, gussets 47 and ribs 48 add unwanted parts and weight to trailer frame 30.

Figure 8:
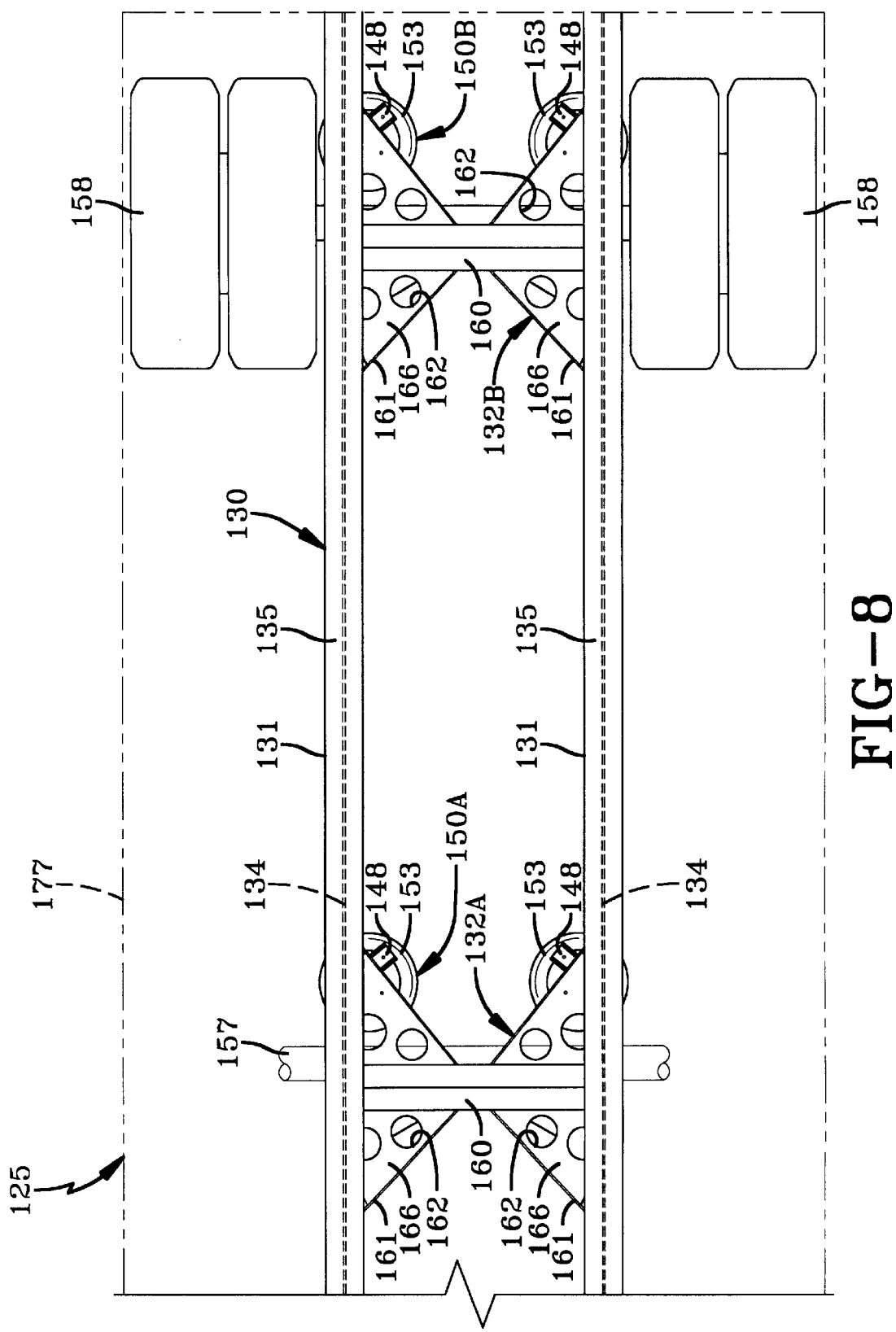
FIG. 8 is a fragmentary top plan view of a flatbed or platform-type trailer incorporating the cross member/suspension assembly mount the present invention, with the trailer deck and hidden parts represented by broken lines.
Figure 9:
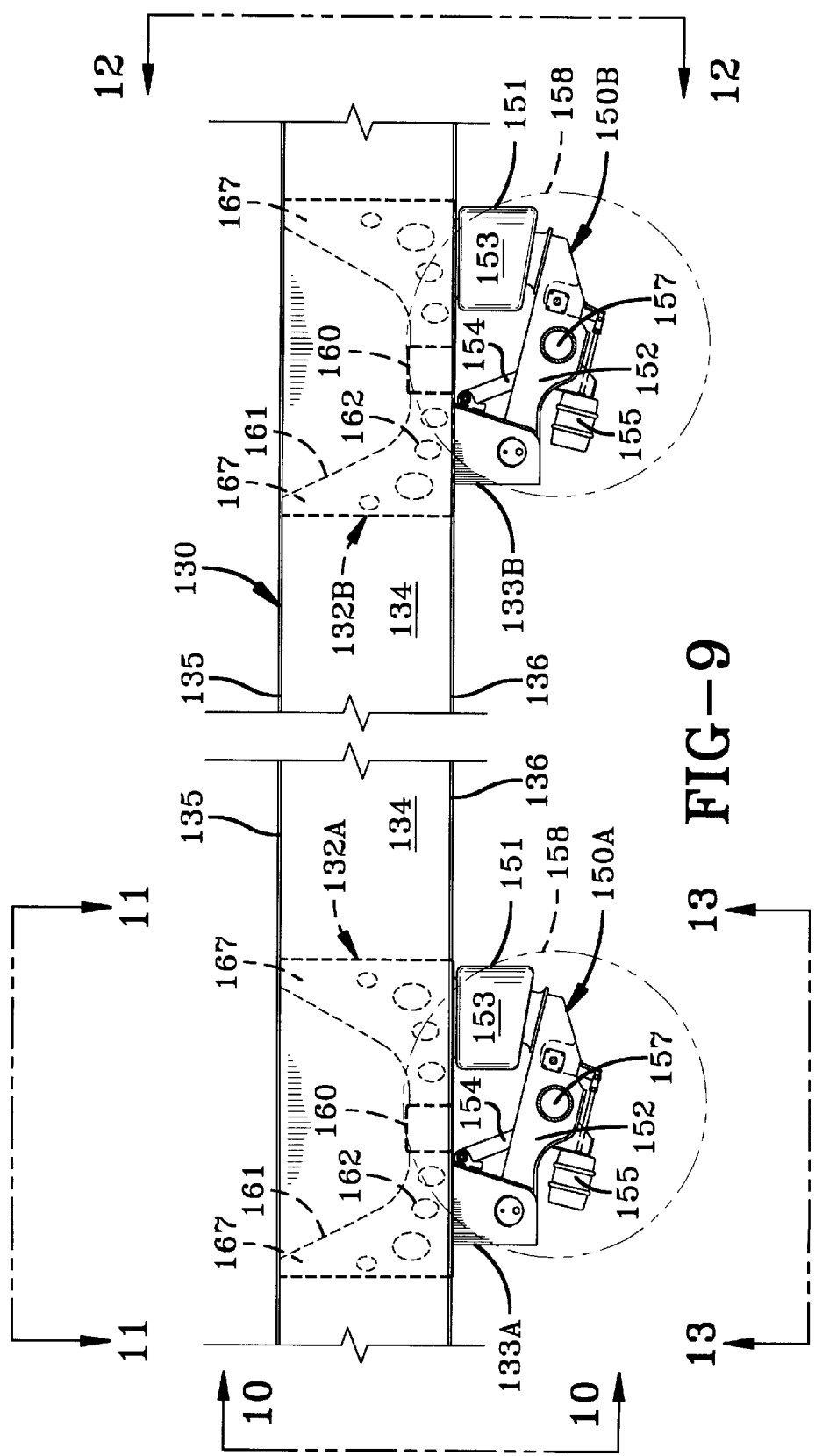
FIG. 9 is a fragmentary side view of the trailer shown in FIG. 8, but with the location of the wheels and hidden parts represented by broken lines.
Figure 10:
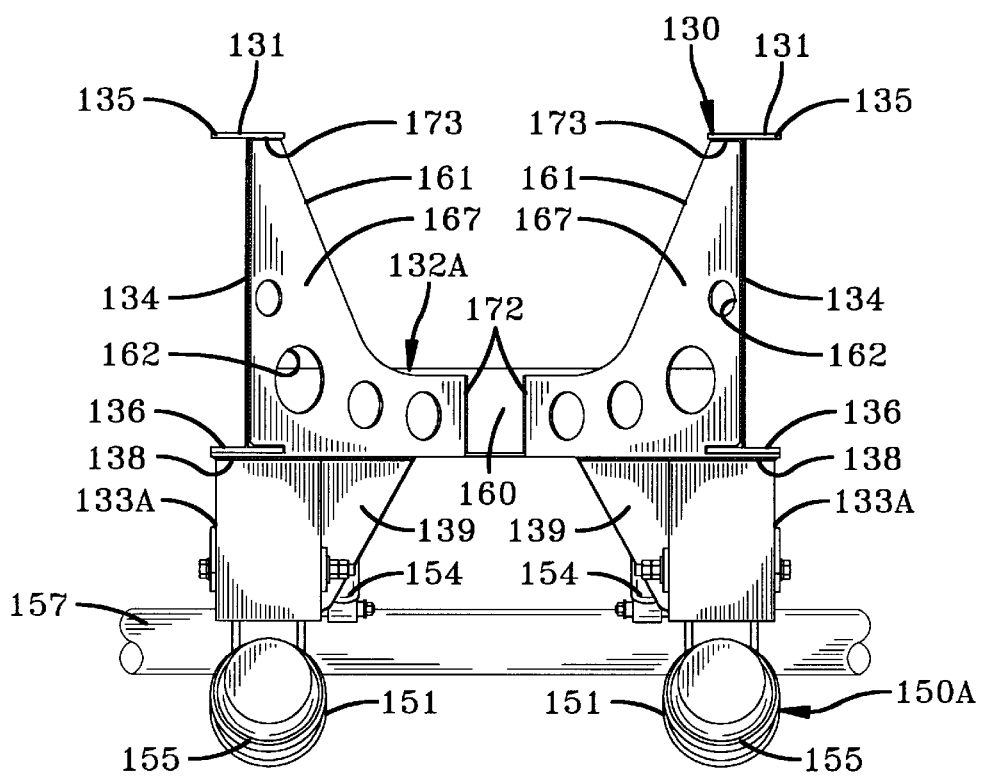
FIG. 10 is an enlarged fragmentary front view of the trailer of the present invention, looking in the direction of lines 10—10 of FIG. 9, and showing the continuous or uninterrupted welds at various junctions of the cross member/suspension system mounting assembly, main members, hangers, and hanger gussets.
Figure 11:
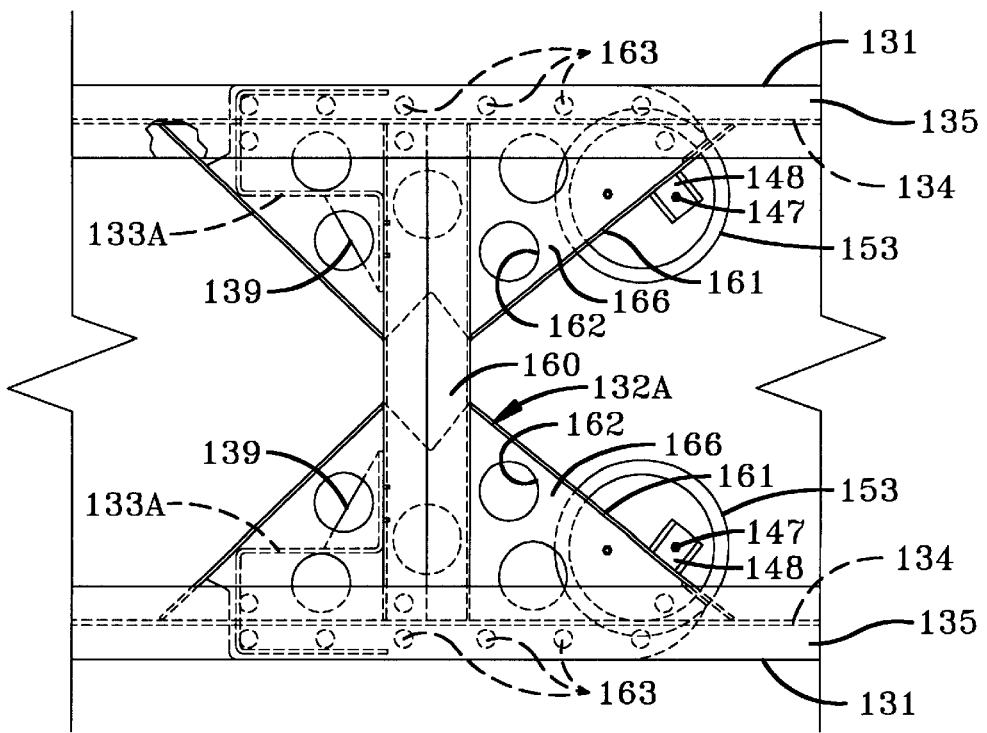
FIG. 11 is an enlarged fragmentary top view looking in the direction of lines 11—11 of FIG. 9, with parts of the axle/suspension system removed, portions broken away and hidden parts represented by broken lines.
Figure 12:
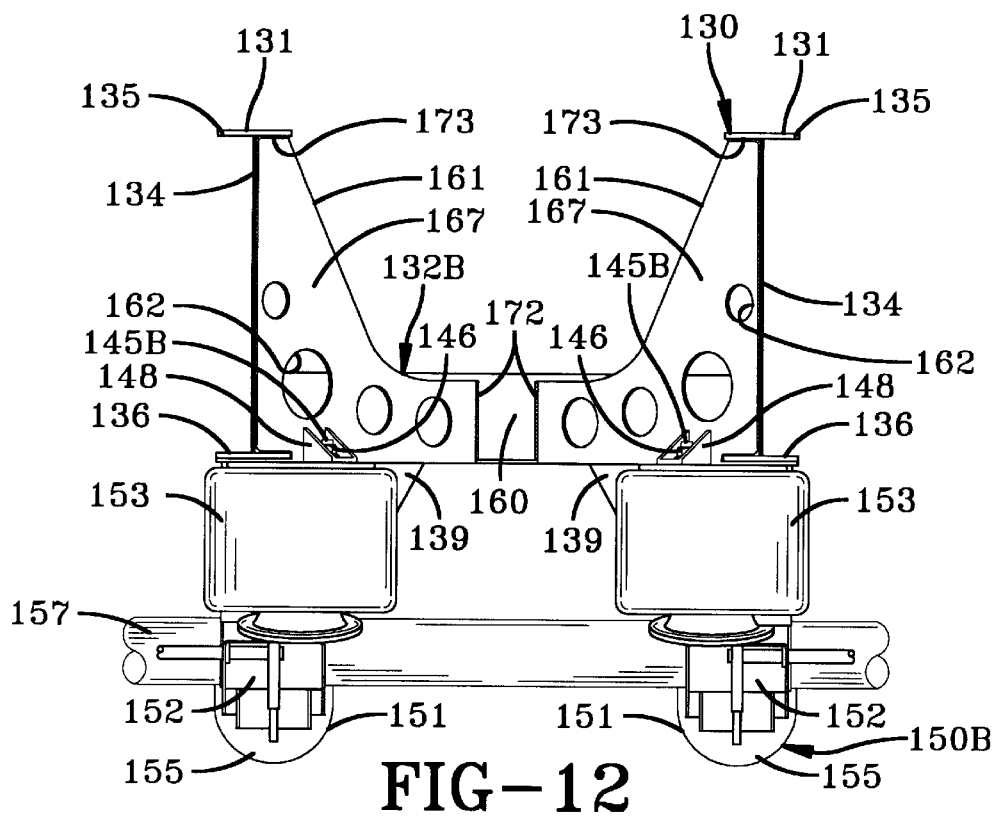
FIG. 12 is an enlarged fragmentary rear view looking in the direction of lines 12—12 of FIG. 9, with portions of the suspension system removed, and showing the continuous or uninterrupted welds at various junctions of the cross member/suspension system mounting assembly and main members.
Figure 13:
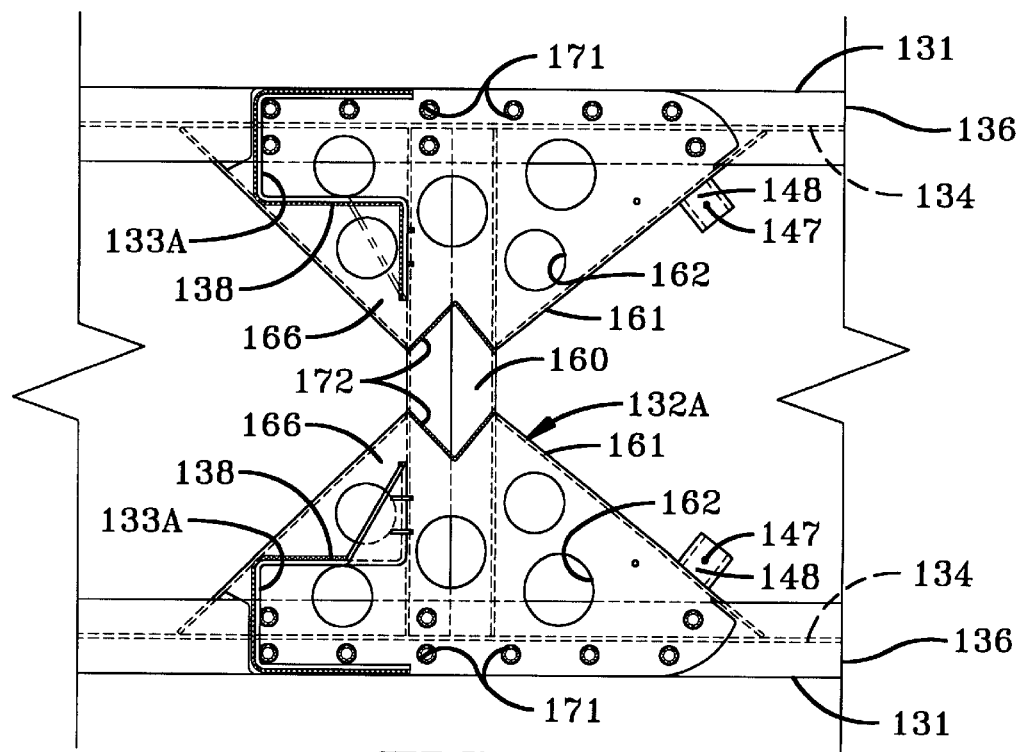
FIG. 13 is an enlarged fragmentary bottom view looking in the direction of lines 13—13 of FIG. 9, with parts of the axle/suspension system removed and hidden parts represented by broken lines, and showing the continuous or uninterrupted pattern of welding at various junctions of the cross member/suspension system mounting assembly, main members, hangers, and hanger gussets.

The improved trailer frame for a vehicle flatbed or platform trailer 125 of the present invention is indicated generally at 130 and is shown in FIGS. 8 and 9. Although trailer frame 130 of the present invention is similar in some respects to prior art trailer frame 30 described in detail hereinabove and shown in FIGS. 1 through 7, trailer frame 130 is different than trailer frame 30 in certain respects, thereby contributing to the improved performance of the trailer frame of the present invention over prior art trailer frames. The structural and resulting performance differences between trailer frames 130 and 30 will be described in detail below. Trailer 125 includes a deck 177, a trailer frame 130 for supporting deck 177, a pair of main members 131, front and rear cross member/suspension system mounting assemblies 132A and 132B, respectively, and front and rear pairs of hangers 133A and 133B, respectively, for suspending front and rear axle/suspension systems 150A and 150B, respectively.

Specifically, each main member 131 is an elongated, generally I-shaped beam made of a metal such as steel or other suitable material. However, it is understood that the shape of main member 131 could be different, such as a C-shaped channel, without affecting the overall concept of the present invention. More particularly, each I-shaped beam 131 includes a vertical web plate 134, which interconnects in a spaced-apart relationship top and bottom horizontal flanges 135 and 136, respectively. Main members 131 are connected to each other in spacedapart parallel relationship by cross member/suspension system mounting assemblies 132A, B which extend between the main members.

Figure 16:
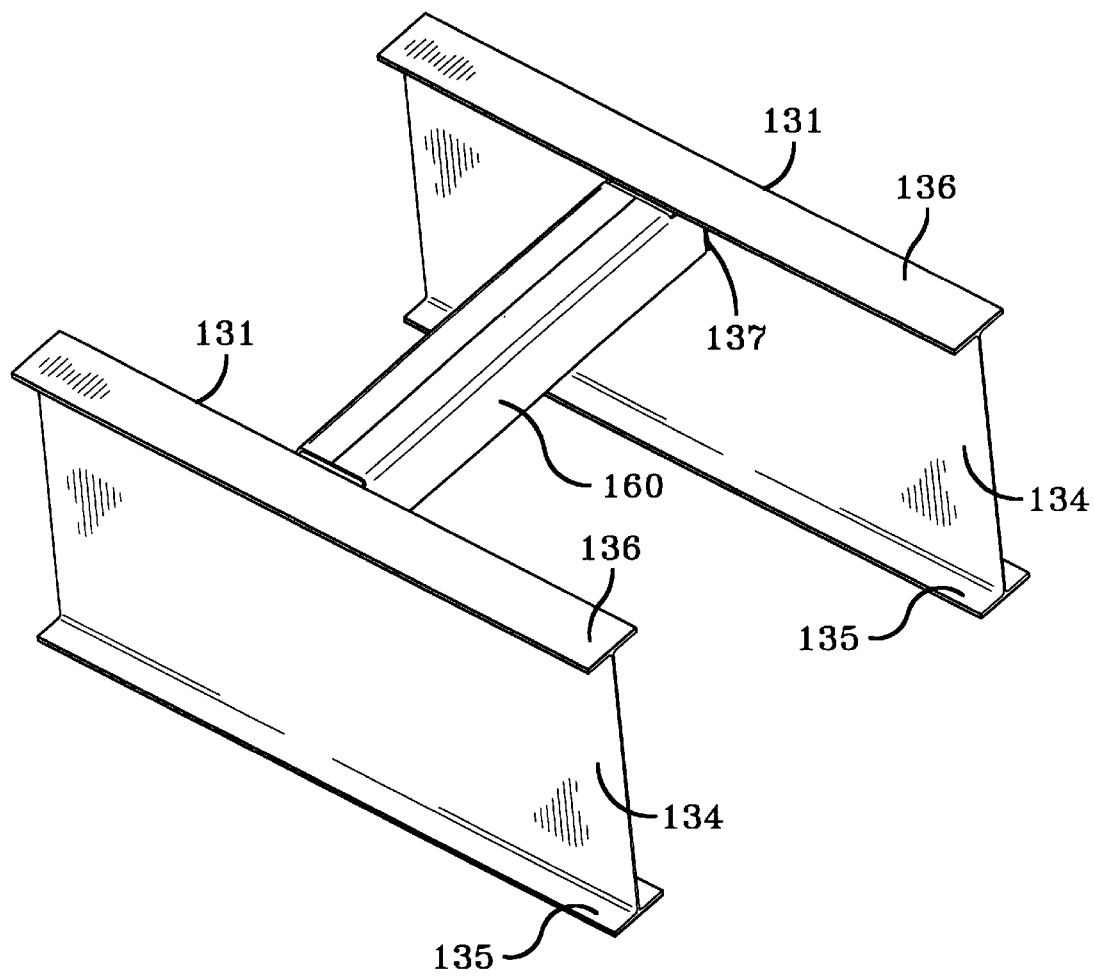
FIG. 16 is a fragmentary perspective bottom view of a trailer frame, showing only the main members and the cross member of the cross member/suspension system mounting assembly of the present invention incorporated into the trailer frame.
Figure 17:
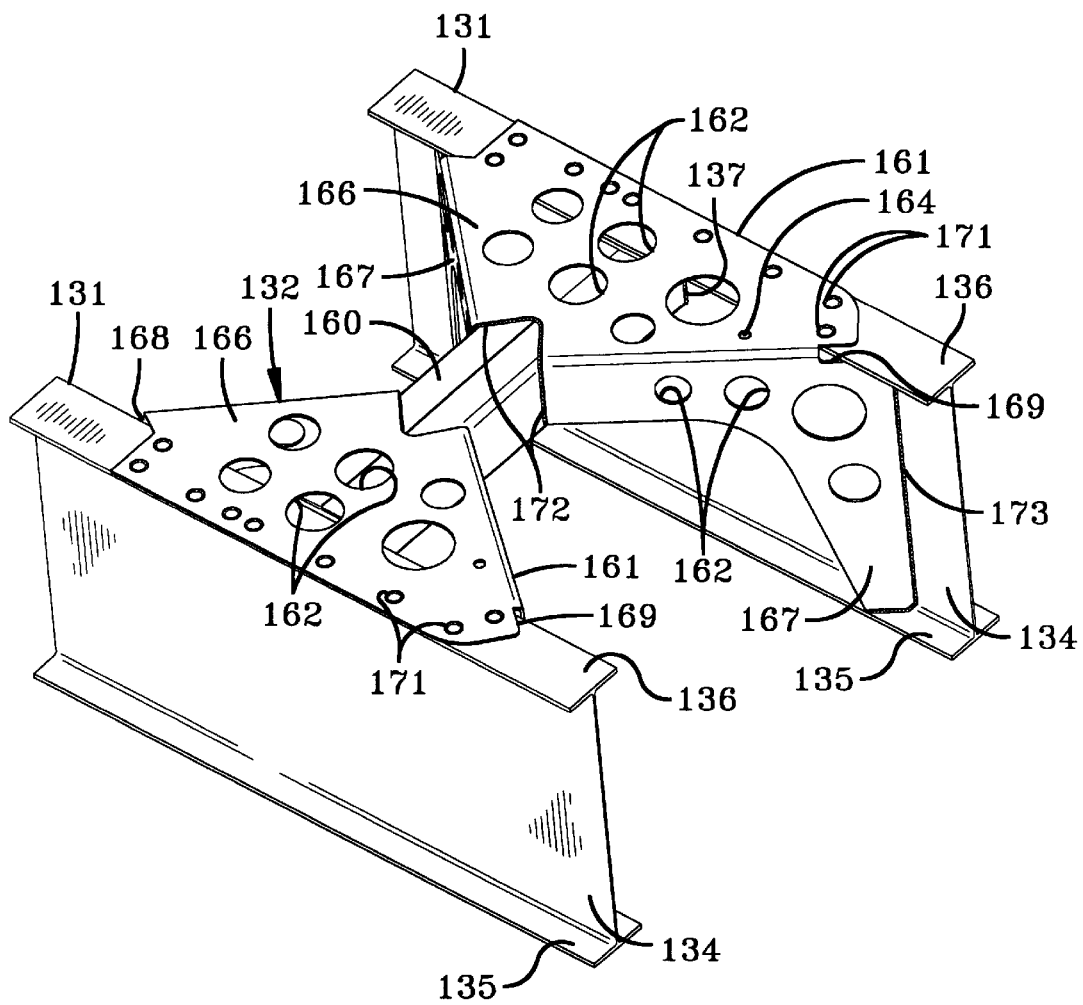
FIG. 17 is a view similar to FIG. 16, but showing the pair of suspension assembly mounting members of the cross member/suspension system mounting assembly of the present invention incorporated into the trailer frame.
Figure 18:
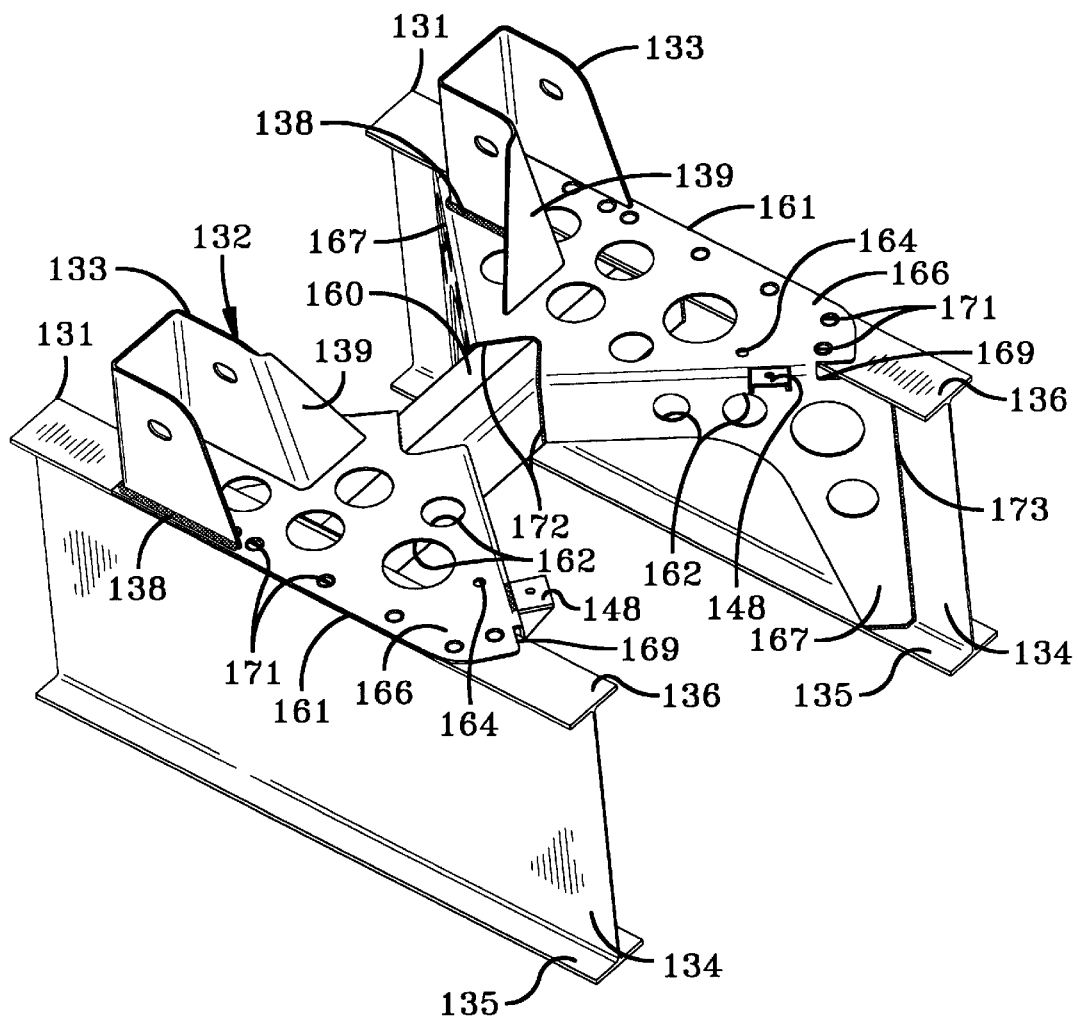
FIG. 18 is a view similar to FIG. 17, but showing the hangers and air spring brackets of the axle/suspension system mounted on the suspension assembly mounting members.
Figure 19:
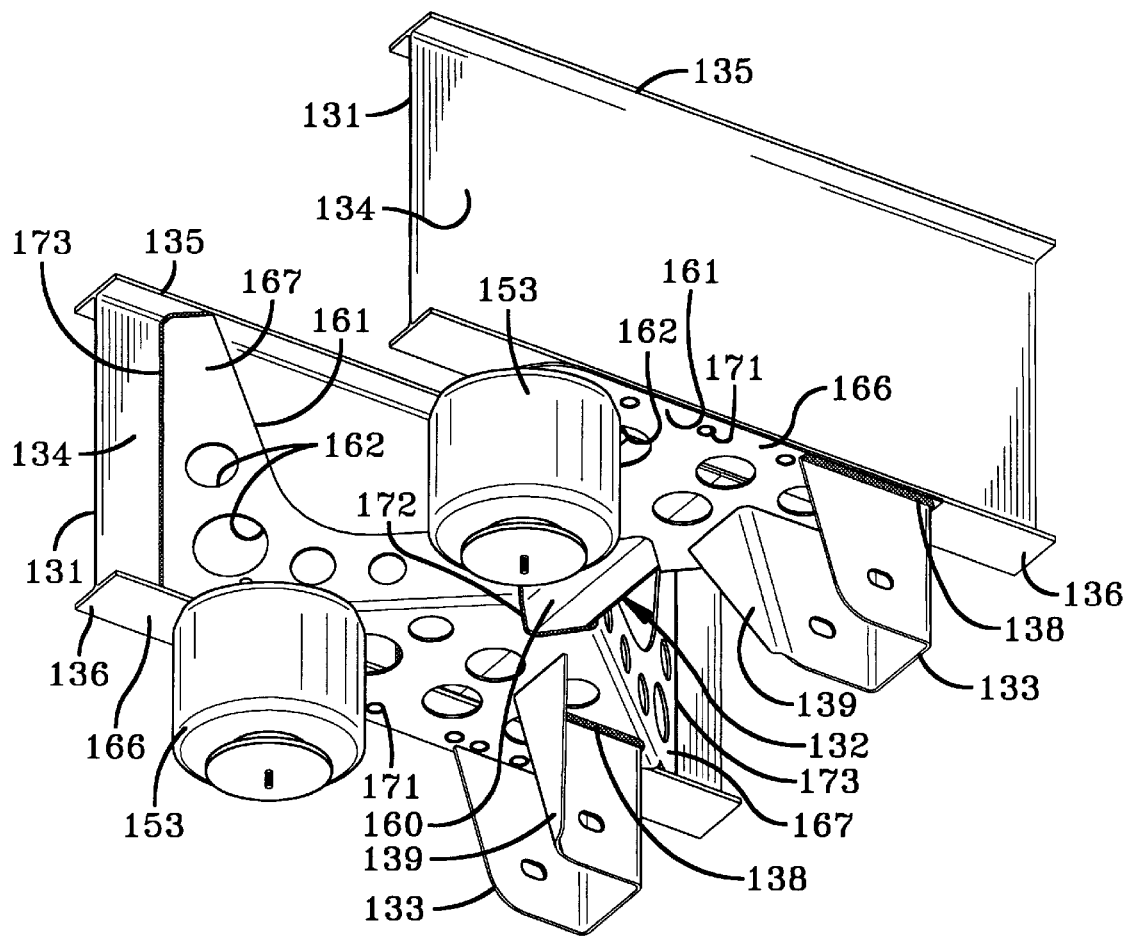
FIG. 19 is another bottom perspective view similar to FIGS. 17 and 18, but showing the air springs of the axle/suspension system mounted on the suspension assembly mounting members.
Figure 20:
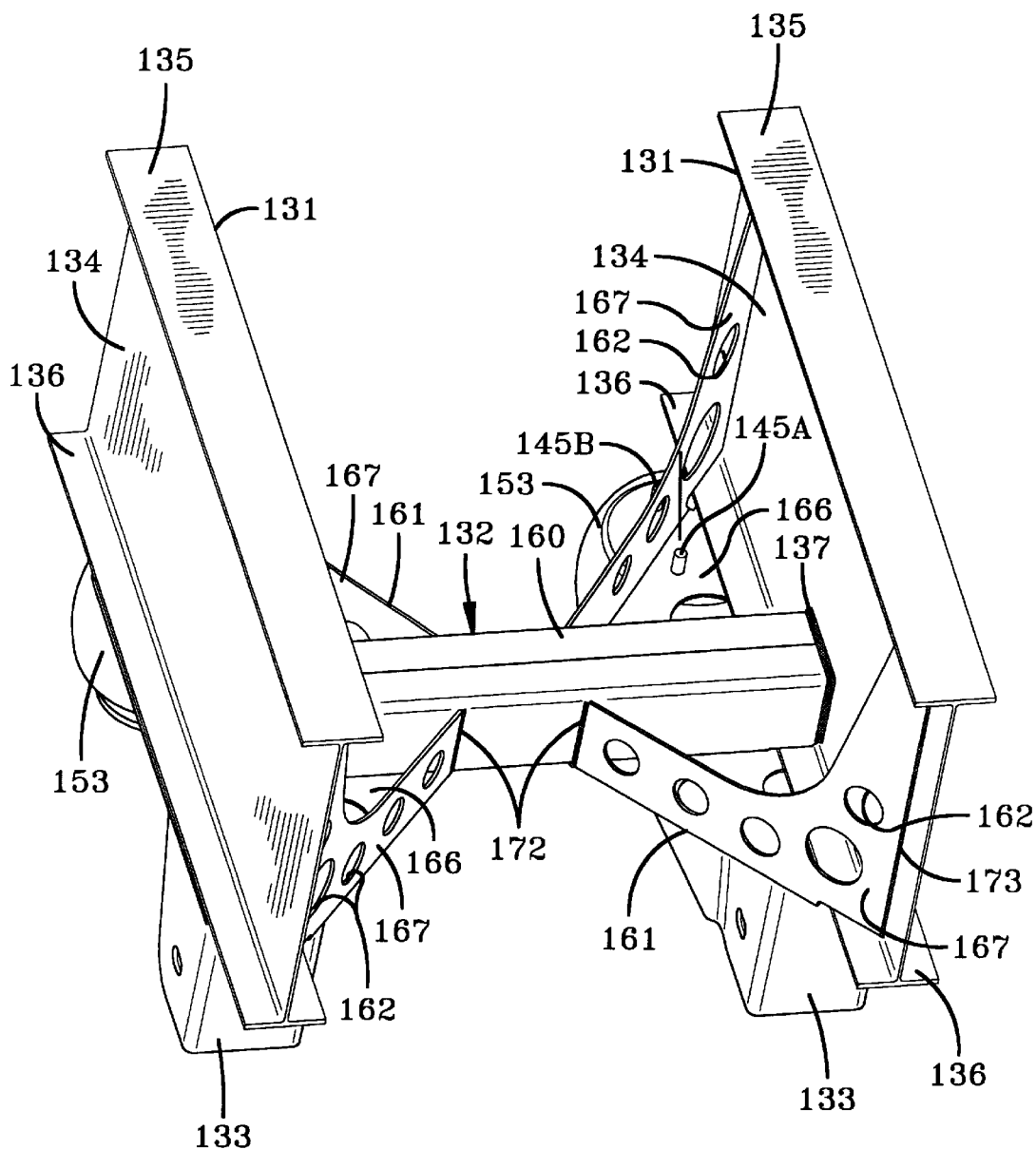
FIG. 20 is a fragmentary top perspective view of the assembly shown in FIG. 19.

In accordance with one of the main features of the present invention, and as best shown in FIGS. 10 through 13, each cross member/suspension system mounting assembly 132 includes a cross member 160 which extends between and is perpendicular to main members 131. Cross member 160 preferably is generally square or rectangular-shaped, however other cross-sectional shapes are contemplated by the present invention, such as an inverted U-shaped channel. The bottom surface of each end of cross member 160 is coped or notched as best shown in FIGS. 16 and 20, whereby each end of the cross member nests in a respective one of main members 131 at the inboard right-angle junction of web 134 and bottom flange 136. Cross member 160 is secured to main members 131 by any suitable means such as welding or mechanical fastening, although a continuous weld 137 is preferred.

Figure 14:
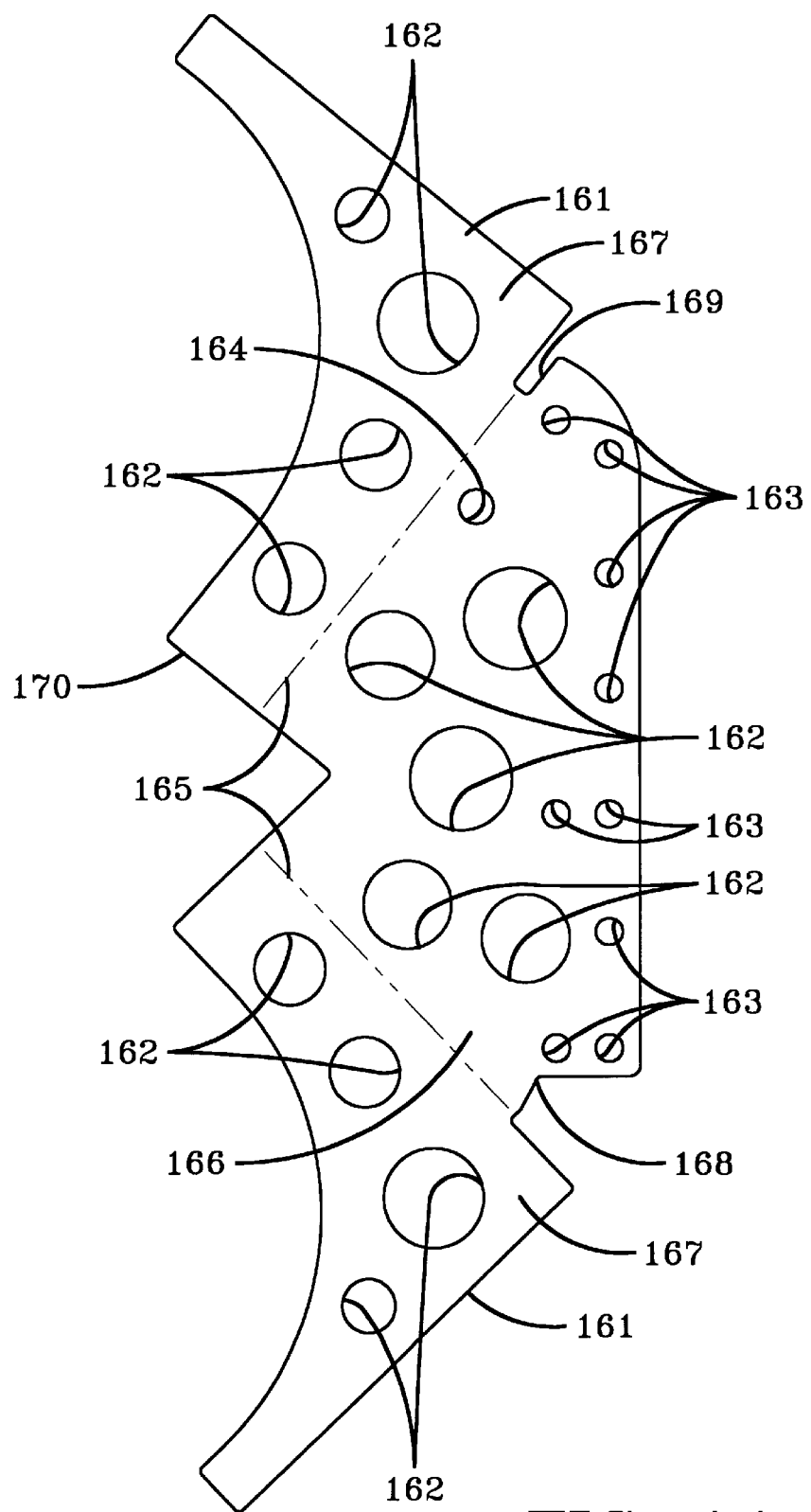
FIG. 14 is a top plan view of one of the two suspension assembly mounting members of the cross member/suspension system mounting assembly of the present invention, as it appears after being burned out of a plate but before reconfiguration and assembly.
Figure 15:
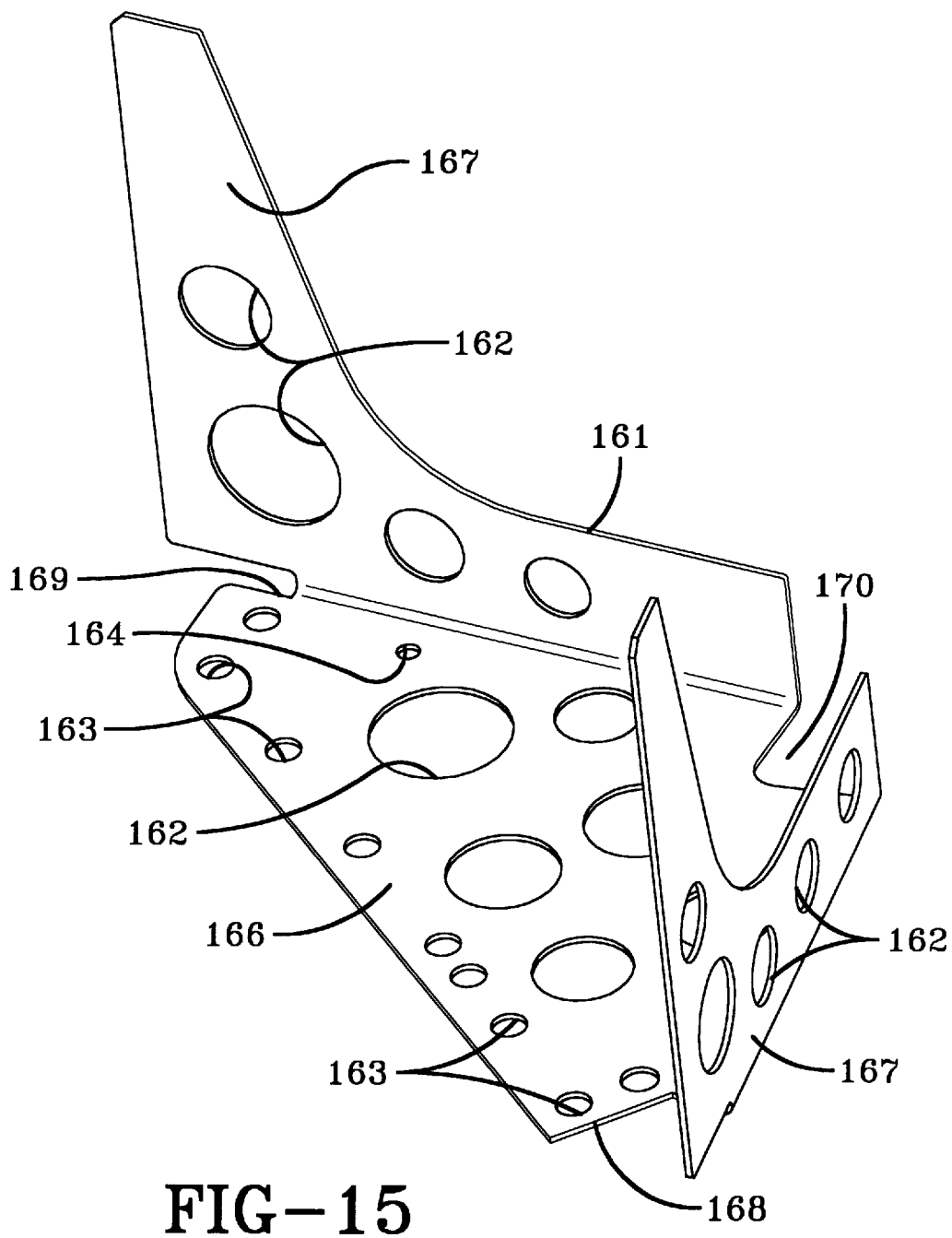
FIG. 15 is a perspective view of the suspension assembly mounting member shown in FIG. 14, and showing its reconfiguration for incorporation into a trailer frame.

In accordance with another of the important features of the present invention, a generally triangular-shaped suspension assembly mounting member 161 fits on each end of cross member 160 and nests in a certain one of main members 131, thereby obviating the need for two additional cross members to assist in the mounting of each axle/suspension system 150 of vehicle trailer 125, as was required in prior art trailer frames such as shown at 30 in FIGS. 1–7 and as described hereinabove. More specifically, each suspension assembly mounting member 161 is formed of any suitable material such as steel, but could also be formed of aluminum. As best shown in FIG. 14, mounting member 161 preferably is burned out, by plasma or laser cutting, of 0.220 inches thick grade 50 common steel plate, although plates of other thicknesses are contemplated by the present invention. The generally rectangular-shape of the steel plate before reconfiguration into generally triangular-shaped mounting member 161 minimizes manufacturing waste. A plurality of holes 162, 163 and 164 are formed in mounting member 161 by burning or punching, for reducing the weight of the member and promoting drainage, for plug welding the member to a certain one of main members 131, and for bolting a component of axle/suspension system 150 thereto, respectively. Prior to mounting on trailer frame 130, the steel plate shown in FIG. 14 is reconfigured along bend lines 165 so that mounting member 161 includes, after reconfiguration into a generally triangular shape, a horizontal mount base 166 and a pair of diagonally opposed vertically extending gussets 167. As best shown in FIGS. 10–15 and 17–20, the coped or notched areas 168 and 169 enable gussets 167 to nest in the inboard facing generally U-shaped area defined by the inboard surface of main member web 134 and the bottom and top surfaces, respectively, of main member top flange 135 and main member bottom flange 136. Notches 168 and 169 also enable the outboard edge upper surface of mount base 166 to abut the bottom surface of main member bottom flange 136. The coped or notched area 170 along the inboard edge of mounting member 161 similarly enables the mounting member to fit on cross member 160. Mounting member 161 then is securely attached to main member 131 by plug welds 171 (FIG. 13) placed in plug weld holes 163 and a continuous weld 172 disposed along the interface of mounting member coped area 170 and cross member 160 (FIGS. 10, 12–13 and 17–20). Mounting member 161 is further secured in place by a continuous weld 173 disposed along the interface of each gusset 167 and main members 131 (FIGS. 10, 12 and 17–20). The advantages of cross member/suspension system mounting assembly 132 over prior art cross members 32 will be described in detail hereinbelow.

As mentioned hereinabove, and as best shown in FIGS. 8, 9, 10 and 12, trailer frame 130 of the present invention supports front and rear axle/suspension systems 150A and 150B, respectively. Inasmuch as each axle/suspension system 150A, B is suspended from trailer frame 130, but does not form an integral part thereof, only the major components of system 150 will be cited for aiding in the description of the environment in which the trailer frame of the present invention is useful. Each axle/suspension system 150A, B includes generally identical suspension assemblies 151 suspended from each hanger of the pair of hangers 133A, B, respectively. Each suspension assembly 151 includes a suspension beam 152 which is pivotally mounted on hanger 133 in a usual manner. An air spring 153 is suitably mounted on and extends between the upper surface of the rearwardmost end of suspension beam 152 and mount base 166 of suspension assembly mounting member 161. More particularly, and as best shown in FIGS. 8, 11–13, and 17 to 20, a front bolt 145A of air spring 153 extends upwardly through bolt hole 164 of mounting member mount base 166 and a nut 146 is threadably engaged therewith. A rear bolt 145B of air spring 153 extends through an opening 147 formed in a bracket 148 which is welded to a rear portion of suspension assembly mounting member 161, and a nut 146 is threadably engaged therewith to secure the air spring to the mount base. A shock absorber 154 extends between and is mounted on suspension beam 152 and hanger gusset 139. Other components of suspension assembly 151, mentioned herein only for the sake of relative completeness, include an air brake 155 and a height control valve (not shown). An axle 157 extends between and is captured in the pair of suspension beams 152 of each axle/suspension system 150A, B. One or more wheels 158 are mounted on each end of axle 157.

As discussed above, one of the most important features of he present invention is cross member/suspension system mounting assembly 132, which includes cross member 160 and suspension assembly mounting members 161 and which replaces and improves upon conventional multiple cross members 32 of prior art trailer frame designs. More particularly, trailer frame 130 of the present invention optimizes the structure and location of cross member/suspension system mounting assembly 132A, B for withstanding lateral, longitudinal, vertical and roll load conditions encountered by the trailer frame primarily during movement of vehicle trailer 125, yet reduces the overall weight of the trailer frame from that of prior art trailer frames by up to about 100 pounds, and simplifies the structure of the trailer for easier assembly. More specifically, and as shown in prior art FIGS. 5 through 7, the design of prior art trailer frame 30 including a plurality of cross members 32 for each axle/suspension system 50, requires many weld starts and stops. Such interrupted welds make trailer frame 30 more susceptible to cracks C in main members 31 or cross members 32 caused by the lateral, longitudinal, vertical, and roll load conditions that the trailer frame encounters during operation (see FIG. 7A). Cracks also can occur at the cross member to main member interface due to flexible twisting of the trailer frame at the stiff area created by the cross members at the suspension assemblies. Cracks also occur in this area due to side-to-side movement of the main members. Finally, cracks also can occur at the interface of the cross member, hanger, and/or air spring mounting plate with main member bottom flange 36. Moreover, prior art trailer frame designs typically include about thirty (30) component parts to support a single axle/suspension system 50 which increases production and inventory expenses. In addition, the large number of parts makes installation difficult, time consuming, labor intensive and requires a certain level of skill and training for the installer. Finally, the total weight of all thirty (30) of the installed parts can add up to approximately 350 pounds.

In comparison and contrast, the present invention optimizes the ability of trailer frame 130 to withstand such lateral, longitudinal, vertical, and roll loads by utilizing improved cross member/suspension system mounting assembly 132 and furthermore provides for significant weight and manufacturing cost savings from prior art trailer frame designs due to a reduction in parts and associated labor required to assemble those parts. The plurality of cross members 32A to C and 32D to F of prior art trailer frame 30 are replaced by a pair of cross member/suspension system mounting assemblies 132A and 132B, respectively, to achieve such optimization. More particularly, and referring now only to front cross member/suspension system mounting assembly 132A since the structure and function of rear cross member/suspension system mounting assembly 132B is virtually identical, a single cross member/suspension system mounting assembly 132A replaces three separate cross members 32A through C. More specifically, the front and rear of each hanger 33A requires substantial support since the hangers in turn are assisting in supporting the entire axle/suspension system 50A. Heretofore, such as in prior art trailer frame 30 (FIGS. 1 and 2) a pair of spaced-apart parallel cross members 32A and 32B assisted in supporting the front and rear portions, respectively, of hangers 33. Comparing and contrasting the present invention (FIGS. 9 and 11 and 18–19), the front portion of mounting member 161 supports the front portion of hanger 133A, and cross member 160 generally supports the rear portion of hanger 133A. Moreover, rather than using still another cross member 32C and mounting plate 42 to support air spring 153, the present invention utilizes the rear portion of mounting member 161 to support air spring 153. Bracket 148 merely supplies additional stability to air spring 153. It should also be noted that cross member/suspension system mounting assembly 132 of the present invention eliminates the need for additional stiffeners 41, gussets 47 and ribs 48 found in prior art trailer frame 30, which are all required to assist in supporting the relatively high vertical web 34 of main members 31. A pair of gussets 167 formed on each mounting member 161 serve this function in the trailer frame of the present invention. Also, the generally triangular design of mounting member 161 effects diagonal bracing of main member 131, which serves to reduce the degree of flex of the main members due to lateral loads by directing such loads to cross member 160 which is very efficient at dissipating twisting loads. Diagonally disposed gussets 167 also function to resist vertical and side loads. The large area of mount base 166, in combination with cross member 160, also stabilizes main member bottom flange 136.

The structure of cross member/suspension system mounting assembly 132 even provides additional benefits. As shown in FIGS. 10, 12–13 and 16–20 welds 137, 138, 172, and 173 are continuous or uninterrupted, in stark contrast to the stop and start welds found in prior art trailer frames such as shown and described herein. Such continuous welds simply are less likely to crack than the interrupted welds commonly found in prior art trailer frames.

Finally, the improved structure of cross member/suspension system mounting assembly 132A contains only eight (8) parts as opposed to the thirty (30) parts commonly found in prior art designs, thereby reducing the overall weight of about 350 pounds by nearly eighty (80) pounds. The simplified structure of the present invention also reduces manufacturing costs of the trailer frame by lowering production, inventory and assembly costs.

It is understood and contemplated that the cross member/suspension system mounting assembly of the present invention can be utilized on trailer frames having more or less than the two (2) axles illustrated and described herein.

Accordingly, the improved cross member/suspension assembly mount for vehicle trailer frames is simplified, provides an effective, safe, inexpensive, and efficient mount which achieves all the enumerated objectives, provides for eliminating difficulties encountered with prior vehicle trailer frames, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle trailer frame cross member/suspension assembly mount is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A vehicle trailer frame, said frame including:
   a) a pair of elongated spaced-apart parallel main members; and
   b) at least one cross member/suspension system mounting assembly, said assembly including:
      i) a cross member having a pair of ends, said cross member extending between said main members, and each of said cross member ends being attached to a respective one of said main members; and
      ii) a pair of suspension assembly mounting members, each of said mounting members being attached to a respective one of said cross member ends and a respective one of said main members, each of the mounting members being generally triangular-shaped and including a horizontally-disposed, generally triangular-shaped base and a pair of spaced-apart, vertically extending and diagonally opposed gussets, said gussets each extending vertically a substantial distance relative to the height of its respective main member, so that an axle/suspension system can be mounted on and depend from said cross member/suspension system mounting assembly, whereby the frame is prevented from significantly deflecting from an unchanged shape to a changed shape.

2. The vehicle trailer frame of claim 1, in which a plurality of holes are formed in the base and the gussets of each of the suspension assembly mounting members.

3. The vehicle trailer frame of claim 1, in which the cross member is disposed perpendicular to said main members.

4. The vehicle trailer frame of claim 1, in which each of the cross member ends nests in and is attached by a continuous weld to a respective one of the main members; and in which each of the suspension assembly mounting members fits on said cross member and nests in a respective one of said main members, and is attached to said cross member and said main member by generally continuous welds.

5. The vehicle trailer frame of claim, 4, in which a hanger is mounted by a generally continuous weld and depends from each of the suspension assembly mounting members.

6. The vehicle trailer frame of claim 5, in which an air spring is mounted on and depends from each of the suspension assembly mounting members.

7. The vehicle trailer frame of claim 5, in which a suspension assembly is mounted on the hanger of each of the suspension assembly mounting members; and in which an axle extends between and is captured in said pair of suspension assemblies.

8. A method of assembling a vehicle trailer frame, said method including the steps of:

a) positioning a cross member having a pair of ends to extend between a pair of elongated spaced-apart parallel main members;

b) attaching each of said cross member ends to a respective one of the main members with a continuous weld;

c) reconfiguring each one of a pair of suspension assembly mounting members from a flat, generally rectangular member into a member having a horizontally-disposed, generally triangular-shaped base and vertically extending, diagonally opposed gussets;

d) attaching each one of said pair of suspension assembly mounting members to a respective one of said cross member ends and to a respective one of said main members by generally continuous welds;

e) attaching a depending hanger to each of the suspension assembly mounting members with a generally continuous weld; and f) attaching a depending axle/suspension system to said suspension assembly mounting members and said hangers.

9. The method of assembling a vehicle trailer frame of claim 8, in which the cross member is disposed perpendicular to said main members.

10. The method of assembling a vehicle trailer frame of claim 9, in which each of the cross member ends is nested in a respective one of the main members; and in which each of the suspension assembly mounting members is fitted on said cross member and nests in a respective one of said main members.

11. A vehicle trailer frame, said frame including:

a) a pair of elongated spaced-apart parallel main members; and b) at least one cross member/suspension system mounting assembly, said assembly including:

i) a cross member having a pair of ends, said cross member extending between said main members, and each of said cross member ends being attached to a respective one of said main members; and ii) a pair of suspension assembly mounting members, each of said mounting members being attached to a respective one of said cross member ends and a respective one of said main members, each of the mounting members being generally triangular-shaped and including a horizontally-disposed, generally triangular-shaped base, and a pair of spaced-apart, vertically extending and diagonally opposed gussets, said gussets each extending vertically a substantial distance relative to the height of its respective main member, said base and said gussets each being formed with a plurality of holes, so that an axle/suspension system can be mounted on and depend from said cross member/suspension system mounting assembly, whereby the frame is prevented from significantly deflecting from an unchanged shape to a changed shape.

* * * * *